US008313083B2

(12) United States Patent
Tabelander

(10) Patent No.: US 8,313,083 B2
(45) Date of Patent: Nov. 20, 2012

(54) SIGNALING OF THE ACTIVE SAFETY POSITION OF ELECTROPNEUMATIC POSITION REGULATORS

(75) Inventor: Stefan Tabelander, Herford (DE)

(73) Assignee: ABB Technology AG, Zürich (CH)

( * ) Notice: Subject to any disclaimer, the term of this patent is extended or adjusted under 35 U.S.C. 154(b) by 569 days.

(21) Appl. No.: 12/501,999

(22) Filed: Jul. 13, 2009

(65) Prior Publication Data

US 2010/0006790 A1 Jan. 14, 2010

(30) Foreign Application Priority Data

Jul. 14, 2008 (DE) ......................... 10 2008 033 047

(51) Int. Cl.
*F16K 31/44* (2006.01)

(52) U.S. Cl. ..................... 251/69; 251/129.04; 137/557; 137/487.5

(58) Field of Classification Search .................... 251/69, 251/129.04; 137/554, 557, 487.5
See application file for complete search history.

(56) References Cited

U.S. PATENT DOCUMENTS

| | | | | |
|---|---|---|---|---|
| 5,431,182 | A * | 7/1995 | Brown | 137/487.5 |
| 5,651,385 | A * | 7/1997 | Karte | 137/487.5 |
| 6,035,878 | A | 3/2000 | Adams et al. | |
| 6,186,167 | B1 * | 2/2001 | Grumstrup et al. | 137/487.5 |
| 6,862,547 | B2 * | 3/2005 | Snowbarger et al. | 137/14 |
| 7,556,238 | B2 * | 7/2009 | Seberger | 251/69 |
| 7,900,650 | B1 * | 3/2011 | Wilson | 251/129.04 |
| 2006/0220844 | A1 | 10/2006 | Flander | |
| 2007/0045579 | A1 | 3/2007 | Wirtl et al. | |

FOREIGN PATENT DOCUMENTS

| | | |
|---|---|---|
| DE | 103 03 889 | 4/2004 |
| DE | 698 32 400 | 7/2006 |
| EP | 1 758 007 A1 | 2/2007 |

OTHER PUBLICATIONS

Office Action issued in DE 10 2008 033 047.7-52 dated Aug. 31, 2009.

* cited by examiner

*Primary Examiner* — Eric Keasel
(74) *Attorney, Agent, or Firm* — Buchanan Ingersoll & Rooney PC

(57) ABSTRACT

An electropneumatic position regulator for controlling a pressure-medium-operated actuating drive to which compressed air can be applied via a working connection of the actuating drive. Compressed air is made available to the position regulator via a feed pressure connection, and the pressure regulator includes an electronic control unit configured to assume a safety position in the event of a fault. When the electronic control unit assumes a safety position, a downstream signal output unit, which acts as a driver stage, generates at least one binary fault signal which is indicated in an externally perceptible manner (e.g., visually and/or audibly) by at least one signaling device fitted externally to a housing of the position regulator.

18 Claims, 1 Drawing Sheet

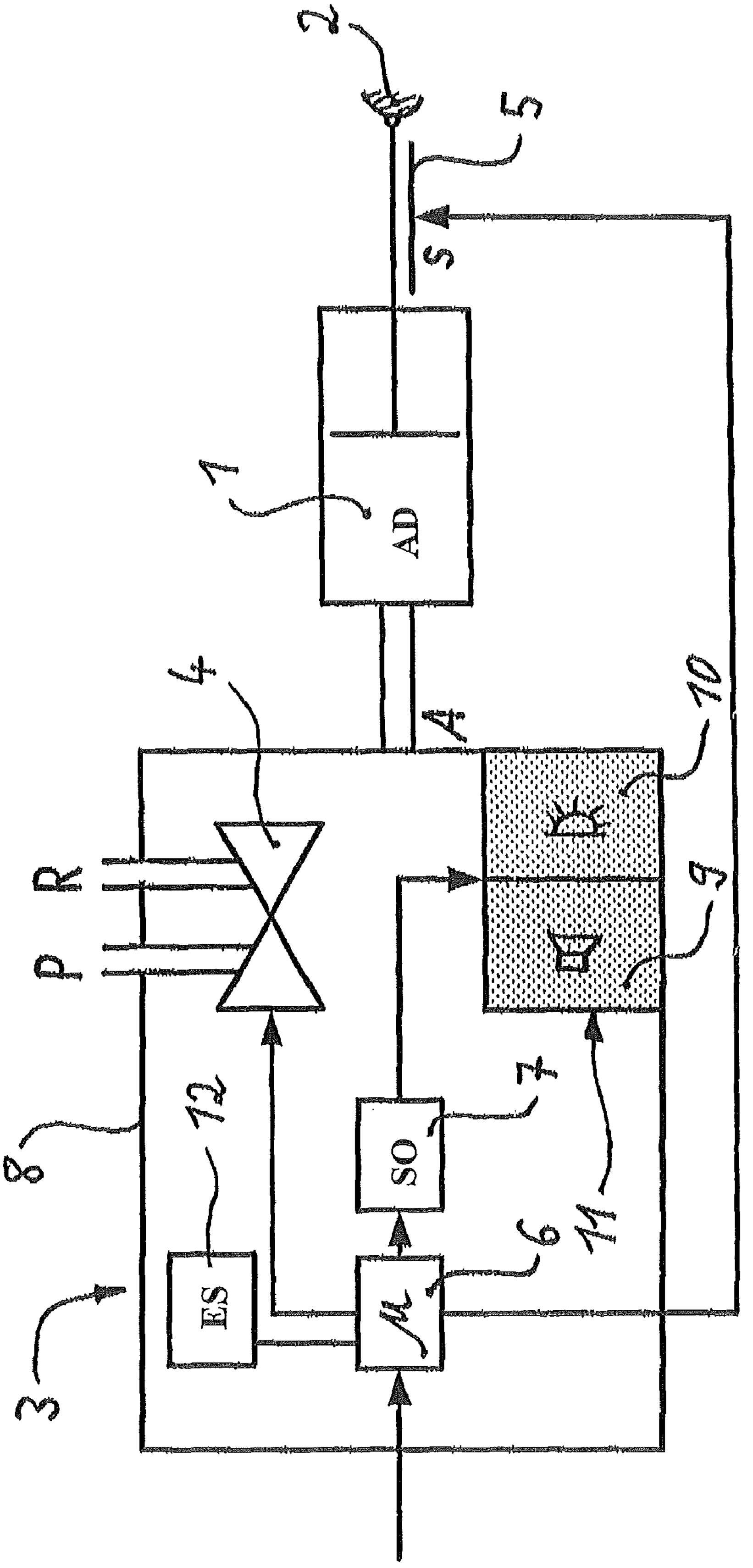
AD
ES
SO
P
R
A
s

SIGNALING OF THE ACTIVE SAFETY POSITION OF ELECTROPNEUMATIC POSITION REGULATORS

RELATED APPLICATION

This application claims priority under 35 U.S.C. §119 to German Patent No. 10 2008 033 047.7 filed in Germany on Jul. 14, 2008, the entire content of which is hereby incorporated by reference in its entirety.

FIELD

The present disclosure relates to an electropneumatic position regulator for controlling a pressure-medium-operated actuating drive to which compressed air can be applied via a working connection A of the actuating drive, which compressed air is made available to the position regulator via a feed pressure connection P, with means being provided for assuming a safety position in the event of a fault. The present disclosure also relates to an actuating drive to which compressed air can be applied and which is equipped with such an electropneumatic position regulator.

BACKGROUND INFORMATION

An exemplary field of use of such position regulators can be position control of actuating or control drives. In this case, an electrical nominal value is preset for a control valve. The control valve converts to a working pressure which is applied, for example, to a spring-reset, single-acting pneumatic cylinder. A position sensor can be arranged on its piston rod, to measure the actuating movement in the actuating drive in reaction to the application of a pressure medium, and to feed this back to the control loop. Depending on the electrical nominal-value preset, the control valve connects the working connection of the electropneumatic position regulator to the feed-pressure connection for application to the actuating drive to carry out a movement, or to a vent connection to vent the actuating drive, so as to reset a movement. The actuating drive itself is in turn used to operate a fitting, such as a valve within a pipeline system of a process automation installation for the foodstuffs industry, the pharmaceutical industry, the refinery industry or the like, for example.

The pressure-medium-operated position regulators can assume a defined safety position, in the sense of a so-called "shut-down" in the event of a fault, for example, in the event of failure of the feed pressure, so as to ensure the safety of the fitting, which is operated via the feed pressure, in the process automation installation.

EP 1 758 007 A1 discloses a pressure-medium-operated position regulator of this generic type. The position regulator has a valve mechanism, by means of which a feed-pressure connection, a vent connection and a working connection can be switched variably to produce a working pressure for a downstream actuating drive. For the purpose of presetting the desired switch position, the position regulator has two fluid application surfaces, which are arranged opposite one another and each bound a control chamber. The two control chambers are connected to a common control pressure connection, with the interposition of a restriction device. Each control chamber is connected to a vent opening downstream from the two restriction devices. The control valve device can control the two vent openings, and can also close them at the same time. This symmetrical design with respect to the two fluid application surfaces in conjunction with control via a jointly associated control pressure connection offers the guarantee that the fluidic actuating forces that act on the position regulator when both vent openings are closed at the same time compensate for one another, resulting in a clearly defined position.

For instance, it is possible to preset a basic position of the actuating device when the vent openings are closed, in which the working connection is disconnected both from the feed connection and from the vent connection, that is to say, corresponds to the central, closed switch position of a 3/3-way valve, such that a constant pilot pressure is maintained so as to provide the position regulator with a blocking failure behavior. This blocking failure behavior is achieved here by appropriate electrical control of the position regulator.

In conventional position regulators, the "shut-down" function, which has already been mentioned above, can be used as a safety position for position regulation. In this case, the position regulator switches to safe venting of the position drive, as a result of which the position drive can move the valve mechanism of the position regulator to a safe position, specifically entirely open or entirely closed, with the aid of the spring effect of the integrated reset spring. This "shut-down" function is activated in various fault situations, such as:

- a diagnosis unit of the position regulator signals a serious signal-processing fault within the electronic control unit, as a result of which the actuating drive is no longer serviceable, for example "RAM/ROM/NV check not OK" or "Position sensor defective";
- the electrical power supplied to the position regulator is not sufficient to ensure operation; in the case of conventional position regulators, this is the case from less than approximately 3.8 mA or, if the supply voltage is inadequate, such as less than 9.7 V;
- control of the "shut-down" function by other events which are determined by, for example, sensors outside the position regulator, and which are passed to the position regulator via a signal input.

When the position regulator assumes the defined safety position as a result of the events described above or other comparable events, in the case of the conventional pressure regulators, the signaling of the defined safety position takes place only via the electrical connecting line, which generally corresponds to a standardized bus protocol; that is, messages back from the position regulator can also be passed to a superordinate control line. Another known possibility is for a mechanical marking to be applied to the actuating drive which, when viewed from the immediate vicinity, can provide the operator with information that the actuating drive, and therefore the position regulator, has assumed the safety position. In the case of modern man-machine interfaces, a message such as this can also be displayed via an indication text, such as a diagnosis message, for example.

However, the solutions from the conventional art as described above have a disadvantage in that, when the position regulator is viewed from further away, the forms of signaling explained above cannot be observed accurately or at all. Particularly in operating situations in which a plurality of position regulators with actuating drives are arranged alongside one another, even if it is known that one of these position regulators is faulty, it is difficult for the operator to ascertain which of the position regulators is affected by the fault condition.

SUMMARY

An exemplary embodiment provides an electropneumatic position regulator for controlling a pressure-medium-operated actuating drive. The exemplary position regulator comprises a working connection configured to apply compressed air to the actuating drive, and a feed pressure connection configured to receive the compressed air. The exemplary position regulator comprises an electronic control unit configured to assume a safety position in the event of a fault, the electronic control unit being integrated within a housing of the position regulator. The exemplary position regulator also comprises a downstream signal output unit configured to, upon the electronic control unit assuming the safety position, to generate at least one binary fault signal, and at least one signaling device configured to transform the at least one binary fault signal into a signal perceivable outside the housing of the position regulator. The at least one signaling device is configured to transform the at least one binary fault signal into at least one of an audible and a visual signal perceivable outside the housing of the position regulator.

An exemplary embodiment provides an electropneumatic position regulator for controlling a pressure-medium-operated actuating drive. The exemplary position regulator comprises an electronic control unit configured to assume a safety position in the event of a fault, the electronic control unit being integrated within a housing of the position regulator. The exemplary position regulator also comprises a downstream signal output unit configured to, upon the electronic control unit assuming the safety position, to generate at least one binary fault signal, and at least one signaling device configured to transform the at least one binary fault signal into a signal perceivable outside the housing of the position regulator. The at least one signaling device is configured to transform the at least one binary fault signal into at least one of an audible and a visual signal perceivable outside the housing of the position regulator.

BRIEF DESCRIPTION OF THE DRAWINGS

Further advantages and refinements of the present disclosure are explained in more detail below with reference to exemplary embodiments which are illustrated in the attached drawing, in which:

FIG. 1 illustrates a block diagram of an exemplary configuration of a position regulator according to at least one embodiment.

DETAILED DESCRIPTION

Exemplary embodiments of the present disclosure provide an improved electropneumatic position regulator, which can assume a safety position in the event of a fault, such that the assumed safety position can also be perceived by human senses from further away, relative to the physical location of the position regulator.

According to an exemplary embodiment, when a locally integrated electronic control unit in the position regulator determines the existence of an assumed safety position, a downstream signal output unit, which can act as a driver stage, can generate at least one binary fault signal to be indicated in an externally perceptible manner by visual and/or audible signaling means fitted, for example, to an external housing of the position regulator.

An advantageous feature of various exemplary embodiments provided herein is that the power of the driver stage makes it possible to produce a very strong notification signal (audible and/or visual), which can be perceived even over a long distance. As a result of the choice of the indication by means of a binary fault signal, the fault can be clearly identified and the possibility of misinterpretation of the signal indication is effectively eliminated. By fitting the signaling means externally on the position regulator housing, this ensures clear perceptibility directly in situ, with clear association, at the same time of the notification, with the position regulator affected by the fault.

According to an exemplary embodiment, it is sufficient for the binary fault signal to be indicated audibly or visually, or a combination thereof. Both indication formats can be perceived well by human sensory organs, with visual signaling having the advantage that clear association with the position regulator affected by the fault is possible even over relatively long distances. However, it is also possible to use visual and audible signaling means together with one another.

According to an exemplary embodiment, an audible binary fault signal can be generated as an AF tone signal. An audio-frequency range of such a signal should be selected audibly perceivable by a human, such as a relatively high audio-frequency range around 1000 Hz, for example.

According to an exemplary embodiment, a visual binary fault signal can be generated as a low DC voltage signal, via signaling means, such as at least one light emitting diode (LED) or another device capable of producing a visual indication, for example. The low DC voltage signal can be in a range between 3-12 V, for example, depending on the operating voltage of the indicator device (e.g., physically small light-emitting diode) to be operated in this way. According to an exemplary embodiment, the indicator device can be at least one LED configured to illuminate various colors, such as red, for example, as brightly as possible to increase perception by human observes. To additionally improve the identification capability, the at least one LED can be controlled to blink and/or display visual indications according to a predetermined pattern of indication with constant or varying intensities of identification.

According to an exemplary embodiment, the exemplary pressure regulator can include at least one micro-loudspeaker for providing audible indications. For example, the micro-loudspeaker can be configured to be switched off, and can be combined with an LED provided adjacent to or within a predetermined proximity of the loudspeaker, for example. In this case, the micro-loudspeaker can also be switched off when required, as a result of which only a visual indication is possible. However, should the user desire additional audible signaling, the micro-loudspeaker can be switched on. This can be accomplished, for example, by means of a physically small dual in-line-package switch on the position regulator housing. Both components, the light-emitting diode and the micro-loudspeaker, can be, for example, arranged on a defined fault indicating area of the position regulator housing. This fault indicating area can have a visually perceivable background (e.g., a colored background) and be placed on the position regulator housing in such a location so that it can be perceived well from the outside, irrespective of the installation situation. The physical proximity, including an associative interrelationship, of the micro-loudspeaker and light-emitting diode can be provided by means of the fault indicating area, for example. According to an exemplary embodiment, the signal output unit can produce a pulse-width-modulated signal (PWM signal) as the binary fault signal, for example.

According to an exemplary embodiment, the fault-dependent safety position can be assumed in the zero-current state of at least one electromagnet for switching the compressed-air flow for the electropneumatic position regulator. The electronic control unit can then sacrifice all of the greater electrical energy which results from this for operation of the signaling means. This makes it possible to achieve powerful signaling of the fault without the increased power requirement initiated by this infringing the limits of the power supply.

If the limits of the electrical power supply have been reached, then, according to an exemplary configuration, an energy storage unit can be integrated in the form of a rechargeable battery or a capacitor and can be connected to the signal output unit. The battery or the capacitor can be of such a size that it possible to provide adequate buffering for the electrical energy for operation of the signaling means over a minimum time of at least one minute, for example.

Further advantages and refinements of the present disclosure are explained in more detail below with reference to exemplary embodiments which are illustrated in FIG. 1, which illustrates a block diagram of an electropneumatic position regulator with an actuating drive connected thereto, in which the position regulator has means for assuming a safety position in the event of a fault.

As illustrated in the example of FIG. 1, an actuating drive 1 to which compressed air can be applied and which can be in the form of a single-acting pneumatic cylinder, for example, is configured to operate a fitting 2 of a process automation installation. The actuating drive 1 can be controlled by an upstream electropneumatic position regulator 3, for example.

The electropneumatic position regulator 3 can be connected to the actuating drive 1 via a working connection A through a pressure medium line, for the purpose mentioned above. The compressed air flowing to the position regulator 3 can be obtained by the position regulator 3 via a feed pressure connection P. Furthermore, the position regulator 3 can also have a vent connection R. A valve mechanism 4, which is integrated in the position regulator 3, can be configured to ensure ventilation or venting of the working connection A on the basis of an electrical control system, in which this connection is connected either to the feed pressure connection P or to the vent connection R. This makes it possible to achieve a desired pressure build-up within the actuating drive 1, as a result of which its piston rod moves out (i.e., external from the housing of the position regulator 3). The distance travelled in this process can be detected by an electrical position sensor 5, and can be preset as an actual value for an electronic control unit 6 for the position regulator 3. In addition, a nominal value can also passed from an external point to the input side of the electronic control unit 6. The electronic control unit 6 uses this to determine the manipulated variable for controlling the valve mechanism 4, so as to operate the actuating drive 1 on a position-controlled basis.

In the event of a fault, the electropneumatic position regulator 3, together with the connected actuating drive 1, can assume a defined safety position, which can likewise be preset by the electronic control unit 6. If this situation occurs, then the electronic control unit 6 controls a downstream signal output unit 7, which, acting as a driver stage, can emit a binary fault signal.

In this case, the downstream signal output unit 7 can output (emit) the binary fault signal either or both audibly and visually, as appropriate. For the audible output of the binary fault signal, a micro-loudspeaker 9 can be fitted to the outside of the position regulator housing 8, can be designed to be particularly physically small, and can be operated via a piezo-element, for example. In addition, a light-emitting diode 10 can be arranged on the position regulator housing 8 to reproduce the binary fault signal visually. The visual reproduction of the binary fault signal can be provided by blinking control. The micro-loudspeaker 9 and light-emitting diode 10 are illustrative of types of indicator devices, and the present disclosure is not limited thereto.

According to an exemplary embodiment, the light-emitting diode 10 can be arranged together with the micro-loudspeaker 9 on a fault indicating area 11 on the position regulator housing 8. The fault indicating area 11 can be located at a point which can be seen at distances external to the outside of the position regulator housing 8, and can ensure that the micro-loudspeaker(s) 9 and the light-emitting diode 10 are combined in such a manner that can be physically or perceived to be closely adjacent thereto.

According to an exemplary embodiment, the safety position, which results from a fault, can be assumed by the electropneumatic position regulator 3 to be in the zero-current state of the electromagnetically controlled valve mechanism 4. The electronic control unit 6 can thereby provide all of the greater amount of electrical energy which results from this for operation of the signaling means. For support, the signal output unit 6 can be connected to an energy storage unit 12 in the form of a rechargeable battery, for example. The energy storage unit 12 can be used for additional buffering of the electrical energy for operation of the signaling means, as a result of which the signaling means can be operated with a high signal strength for a sufficiently long time.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Actuating drive (AD)
2 Fitting
3 Position regulator
4 Valve mechanism
5 Position sensor
6 Control unit
7 Signal output unit (SO)
8 Position regulator housing
9 Micro-loudspeaker
10 Light-emitting diode
11 Fault indicating area
12 Energy storage unit (ES)
P Feed pressure connection
R Vent connection
A Working connection

What is claimed is:

1. An electropneumatic position regulator for controlling a pressure-medium-operated actuating drive, the position regulator comprising:

a working connection configured to apply compressed air to the actuating drive;

a feed pressure connection configured to receive the compressed air;

an electronic control unit configured to assume a safety position in the event of a fault, the electronic control unit being integrated within a housing of the position regulator;

a downstream signal output unit configured to, upon the electronic control unit assuming the safety position, to generate at least one binary fault signal; and at least one signaling device configured to transform the at least one binary fault signal into a signal perceivable outside the housing of the position regulator, wherein the at least one signaling device is configured to transform the at least one binary fault signal into at least one of an audible and a visual signal perceivable outside the housing of the position regulator, wherein the electronic control unit is configured to assume a fault-dependent safety position in a zero-current state of an electropneumatic switching mechanism for switching the compressed-air flow, and wherein the electronic control unit is configured to make all available electrical energy from the assumed fault-dependent safety position for operation of the at least one signaling device.

2. The electropneumatic position regulator as claimed in claim 1, wherein the at least one signaling device comprises at least one piezo-element-operated micro-loudspeaker configured to reproduce the at least one binary fault signal as an AF tone signal.

3. The electropneumatic position regulator as claimed in claim 1, wherein the at least one signaling device comprises at least one light-emitting diode configured to visually reproduce the at least one binary fault signal as a low DC voltage signal.

4. The electropneumatic position regulator as claimed in claim 3, wherein the signal output unit is configured to control the at least one signaling device to reproduce the binary fault signal according to a predetermined pattern of blinking the at least one light-emitting diode.

5. The electropneumatic position regulator as claimed in claim 3, wherein the at least signaling device comprises a micro-loudspeaker configured to be switched off, and the at least one light-emitting diode arranged adjacent to the micro-loudspeaker on a predetermined fault indicating area of the housing of the position regulator.

6. The electropneumatic position regulator as claimed in claim 1, wherein the at least signaling device comprises a micro-loudspeaker configured to be switched off, and a light-emitting diode arranged adjacent to the micro-loudspeaker on a predetermined fault indicating area of the housing of the position regulator.

7. The electropneumatic position regulator as claimed in claim 1, wherein the signal output unit is configured to produce the binary fault signal as a pulse-width-modulated signal.

8. The electropneumatic position regulator as claimed in claim 1, comprising an energy storage unit connected to the electronic control unit and configured to buffer electrical energy for operation of the at least signaling device.

9. The electropneumatic position regulator as claimed in claim 8, wherein the electronic storage unit comprises a rechargeable battery.

10. The electropneumatic position regulator as claimed in claim 8, wherein the electronic storage unit comprises a capacitor.

11. The electropneumatic position regulator as claimed in claim 1, wherein the actuating drive to which the compressed air is applied is constituted by a spring-reset, single-acting pneumatic cylinder.

12. A process automation installation system, comprising:

an electropneumatic position regulator as claimed in claim 1;

a pipeline system;

a fitting included in the pipeline system; and an actuating drive, to which compressed air is applied, the actuating drive configured to be connected to the fitting in the pipeline system.

13. An electropneumatic position regulator for controlling a pressure-medium-operated actuating drive, the position regulator comprising:

an electronic control unit configured to assume a safety position in the event of a fault, the electronic control unit being integrated within a housing of the position regulator;

a downstream signal output unit configured to, upon the electronic control unit assuming the safety position, to generate at least one binary fault signal; and at least one signaling device configured to transform the at least one binary fault signal into a signal perceivable outside the housing of the position regulator, wherein the at least one signaling device is configured to transform the at least one binary fault signal into at least one of an audible and a visual signal perceivable outside the housing of the position regulator, wherein the electronic control unit is configured to assume a fault-dependent safety position in a zero-current state of an electropneumatic switching mechanism for switching the compressed-air flow, and wherein the electronic control unit is configured to make all available electrical energy from the assumed fault-dependent safety position for operation of the at least one signaling device.

14. The electropneumatic position regulator as claimed in claim 13, wherein the at least one signaling device comprises at least one piezo-element-operated micro-loudspeaker configured to reproduce the at least one binary fault signal as an AF tone signal.

15. The electropneumatic position regulator as claimed in claim 13, wherein the at least one signaling device comprises at least one light-emitting diode configured to visually reproduce the at least one binary fault signal as a low DC voltage signal.

16. The electropneumatic position regulator as claimed in claim 15, wherein the signal output unit is configured to control the at least one signaling device to reproduce the binary fault signal according to a predetermined pattern of blinking the at least one light-emitting diode.

17. The electropneumatic position regulator as claimed in claim 13, wherein the at least signaling device comprises a micro-loudspeaker configured to be switched off, and a light-emitting diode arranged adjacent to the micro-loudspeaker on a predetermined fault indicating area of the housing of the position regulator.

18. The electropneumatic position regulator as claimed in claim 13, comprising an energy storage unit connected to the electronic control unit and configured to buffer electrical energy for operation of the at least signaling device.

* * * * *